UNITED STATES PATENT OFFICE.

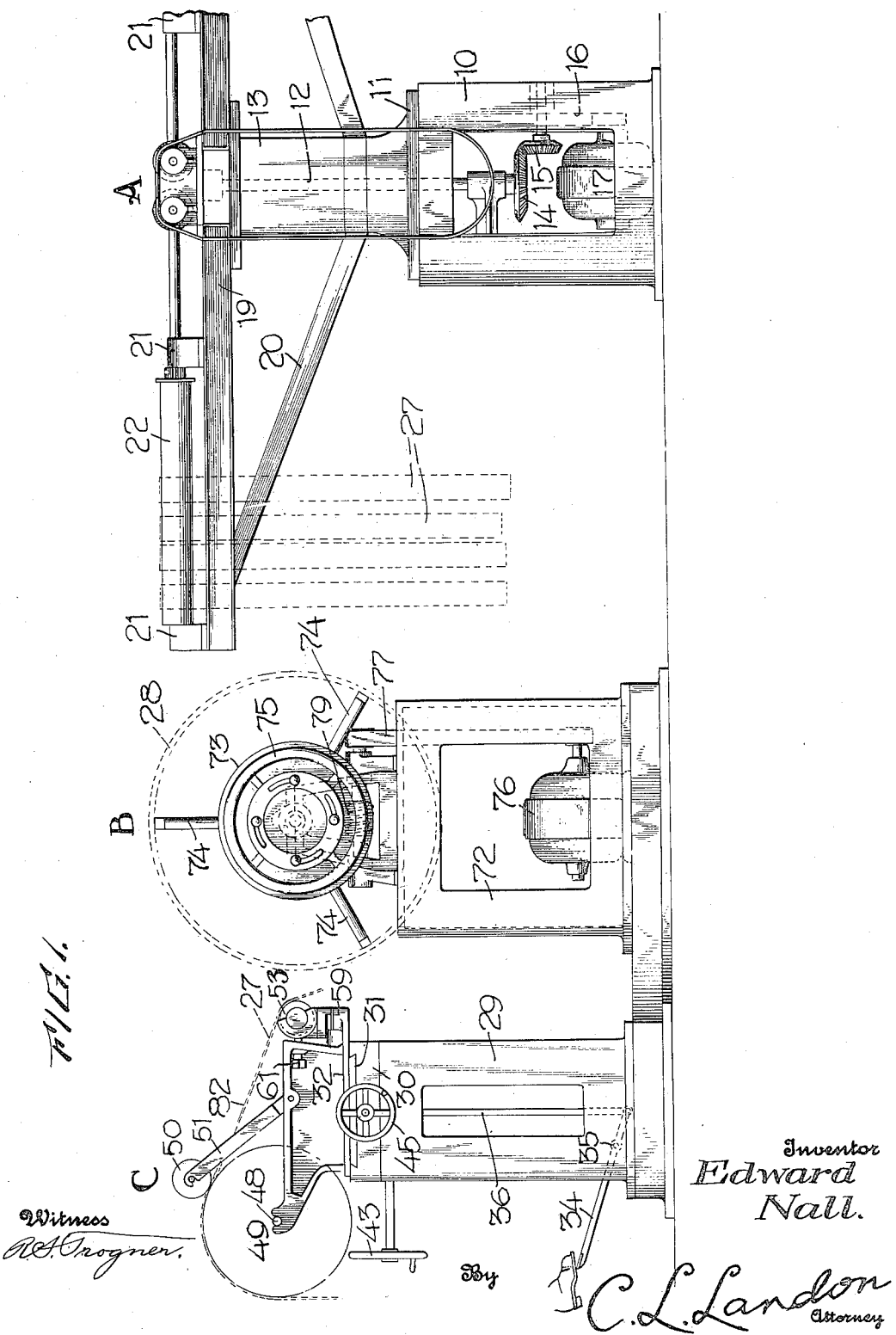

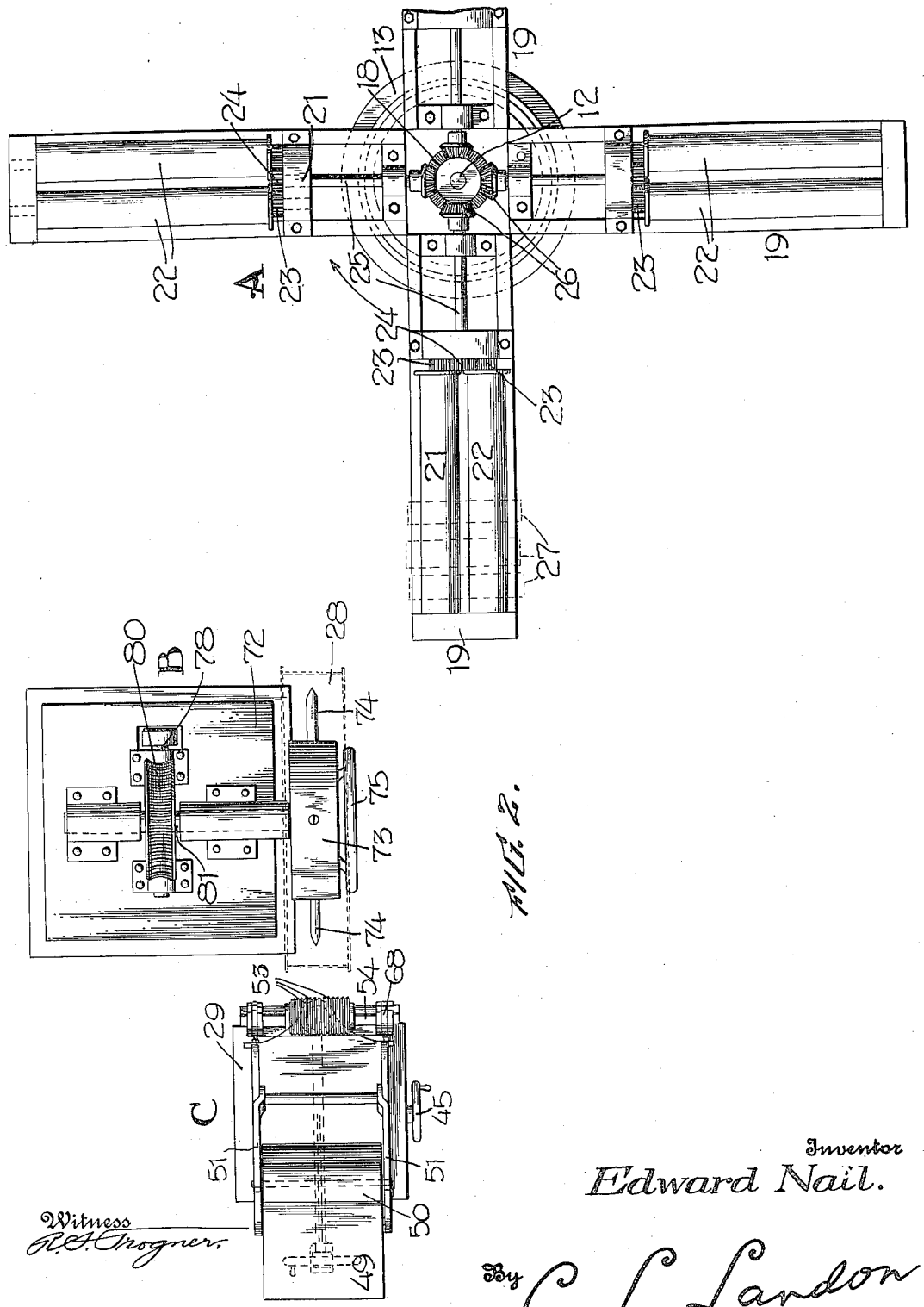

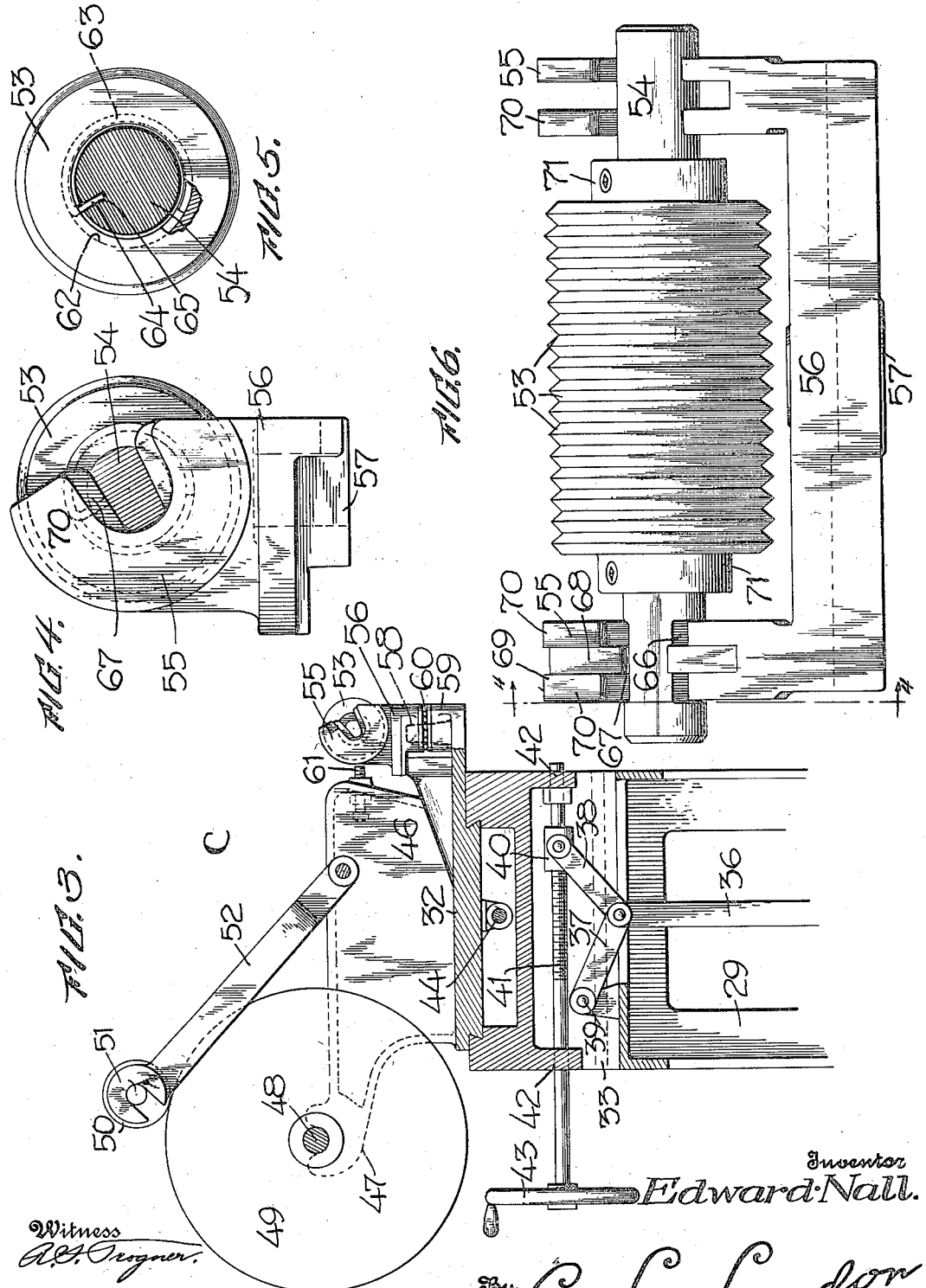

EDWARD NALL, OF AKRON, OHIO, ASSIGNOR TO THE GOODYEAR TIRE & RUBBER COMPANY, OF AKRON, OHIO, A CORPORATION OF OHIO.

APPARATUS FOR ATTACHING TIRE-BASES TO RIMS.

1,317,887.

Specification of Letters Patent.

Patented Oct. 7, 1919.

Application filed November 25, 1916. Serial No 133,393.

*To all whom it may concern:*

Be it known that I, EDWARD NALL, a citizen of the United States, residing at Akron, in the county of Summit and State of Ohio, have invented new and useful Improvements in Apparatus for Attaching Tire-Bases to Rims, of which the following is a specification.

My present invention relates to a system and to an apparatus for securing the thin hard rubber base of solid rubber vehicle tires in place upon the corrugated rim which supports the tire.

One of the most reliable methods of securing a solid rubber tire upon a one-piece channeled rim consists in the provision of circumferential corrugations in the channel of the rim, and in the vulcanization in these corrugations of a thin strip of rubber adapted to cure relatively hard. The main body of the tire is, in turn, vulcanized upon the hard rubber base, and is thus firmly fastened within its rim.

In order that the thin, securing base of the tire may most efficiently perform its function it is essential that it be shaped to conform exactly with the corrugations of the metal rim, as failure to secure conformity of the base to the rim will allow portions of the former to pull away from the rim and thus cause a premature destruction of the whole tire.

Prior manufacturing processes for hard rubber base tires have generally included the application of the base to the metal rim, by hand, a suitable tool being employed by the workman to force the base to take the corrugated contour of the rim channel. It will be obvious, however, that any hand method cannot insure the uniform application of the rubber base to the rim channel, and since the workman can attend to but one circumferential corrugation at a time, it will be apparent that he may fail to obtain that security of attachment which follows from an application of the rubber base to the rim by means covering the whole width of the base at once. The hand method, in addition to being less efficient, is also much more costly.

In view of these conditions, it has been one of the principal objects of the present invention to provide a system and an apparatus whereby the hard rubber bases of solid tires may be mechanically applied to the metal rims with the utmost uniformity, precision, and economy.

It is also a major object of the invention to provide a system of the character set forth which includes means for treating the band of rubber prior to their attachment to the rim, means for mounting a rim for revolution and mechanical stitcher means for applying the previously treated band of rubber uniformly against the corrugations of the channeled rim.

A more specific object of the invention resides in the provision of a stitcher carriage equipped with adjusting means whereby the stitcher supported on the carriage may be centered exactly upon the channel of the rim, means also being provided whereby the mechanical stitcher may be forced into abutting relaton with the rim channel in response to a pressure which remains uniform throughout the entire period of application of any one base band to the rim.

Another specific object of the invention resides in the provision of a mechanical stitcher made up of a number of separate elements, each of the elements corresponding to one of the corrugations in the rim channel and all of the elements being so associated that they may act as a unit although being individually controlled in a yieldable fashion that permits them to ride over any suddenly encountered obstacle along their corrugated paths of movement in contact with the rim, providing an automatic compensation for flaws in the rim corrugations.

The above and additional objects of a similar nature, which will be hereinafter more specifically treated, may be accomplished by such means as are illustrated in the accompanying drawings, described in the following specification and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a side elevation of the base band applying apparatus comprehended by my invention herein;

Fig. 2 is a plan view of the same subject matter;

Fig. 3 is an enlarged detail of the means for centering the stitcher carriage with reference to the rim channel;

Fig. 4 is an enlarged end view of the mechanical stitcher;

Fig. 5 is an individual view of one of the stitcher elements showing the yieldable mounting therefor; and Fig. 6 is a view in front elevation of the mechanical stitcher formed by a group of the elements shown in Fig. 5.

The apparatus of my invention includes three major elements; the drying rack A; the rim stand B; and the stitcher stand C. At the first named, the rubber belts which are to form securing bases for the tires are coated with a suitable rubber cement and allowed to dry until 'tacky" upon their inner surfaces. At the stand B the rims are mounted successively upon a suitable chuck which is rotated at a uniform speed. The stitcher stand C mounts the carriage upon which the belts taken from the drier A are accommodated while being fitted into the channel of the rim and uniformly disposed with respect to the circumferential corrugations thereof.

The stand A comprises a pedestal 10 upon which rests a circular base 11 of the rack, means of any nature being provided whereby the rack may be revolved upon the top of its pedestal. A vertical shaft 12 extends through the center support 13 of the rack and carries at its lower extremity a beveled gear 14 having operative connections with the pinion 15, the latter being adapted to be driven by a belt 16 from an electric motor, or other prime mover, 17 arranged within the pedestal 10. At its upper extremity the shaft 12 carries a gear 18, while a plurality of arms 19 project from the top of the center support 13, being braced thereto in any preferable manner such as indicated by the numeral 20. These arms each carry a set of bearings 21 in which is journaled the pair of roller shafts 22, each of these roller shafts carrying a pinion or gear 23 while a drive pinion 24 is arranged to mesh with each of the shaft pinions for the pairs of rollers 22 upon the respective arms 19. The drive gears 24 are carried at the outer extremity of the drive shafts 25 which radiate from the vertical axis of the center support 13, in alinement with respective arms 19, each of these drive shafts being provided at its inward extremity with a beveled gear 26 in meshing relation with the gear 18 of the vertical shaft 12.

By this arrangement rollers 22 of each pair will rotate in the same direction, and are thus able to impart rotation to the rubber bands 27 supported thereon. These bands are formed from a rubber compound which is to be cured relatively hard, and are of such width as to fit within the channel of the wheel rims 28. To prepare the bands for immediate application to the rims, the operator stationed at the drying rack A coats one side of each band with a suitable quick-drying cement, the ends of each band being lapped to form a temporary ring in order that they may be endlessly supported upon the drying rollers 22.

The drive means described maintain each pair of the rollers 22 in constant motion, irrespective of any rotation of the cruciform rack, which the operator may cause to revolve by hand. After the workman has coated a number of the bands and placed them upon the rack arm 19 nearest him, he rotates the rack body to bring the remaining successively opposite him. These are loaded in a similar manner until the rack has been moved through one complete revolution, which brings the arm carrying the bands first treated again in front of the workman. The cement is now dried to such an extent that the bands may be removed from the rack and carried to the stitcher stand C for immediate application upon successive rims 28.

The stitcher stand includes an upright frame 29, of any suitable construction, mounting the carriage base 30, the latter being formed upon its upper surface with an inset dove-tailed groove 31 to mount the stitcher plate 32 for transverse adjustment. The carriage base 30 is formed, upon its lower surface, with a channel mounting it upon a central rib 33 with which the stand 29 is provided at right angles to the groove 31.

By means of this arrangement, the entire stitcher head including the carriage base and stitcher plate may be moved toward the rim 28, while the stitcher plate may be adjusted transversely to the rim and upon its base in order to secure a perfect centering of the base band to be applied within the channel of the rim.

The means for moving the entire stitcher head toward or away from the revolubly mounted rim 28 consists of a foot lever 34 which is intermediately pivoted to the frame of the stand 29 at the point denoted by the numeral 35, the inner extremity of the lever 34 being connected with an upright link 36, to the upper end of which is pivoted a pair of freely movable yoke arms 37 and 38, the former being connected to a fixed point 39 upon the frame pedestal 29 and the latter connecting to a socket sleeve 40 upon which the force of the operator's depression of the foot lever 34 is delivered to propel the entire stitcher head toward the rim stand B. The socket 40 is internally threaded for engagement upon an adjusting shaft 41, the extremities of which are journaled within suitable bearings 42 formed integrally with the carriage base, a hand wheel 43 being provided whereby the operator can adjust the position of the socket sleeve 40 upon the rod 41 in order to vary the length of the throw imparted to the stitcher head by depression of the foot lever 34. All sliding movement of the stitcher head upon its pedestal 29 takes place, of course, upon the mounting rib 33 before mentioned.

The mechanism whereby the stitcher plate may be centered upon its rim by transverse adjustment along the carriage base 30 includes an adjusting screw shaft 44 which may be manipulated by means of the hand wheel 45 in the usual way. The stitcher plate 32 has erected thereon a pair of side frames 46 the rear extremities of which are formed with open socket portions 47 adapted to loosely accommodate the shaft 48 of a large roll denoted by the numeral 49. Upon the upper surface of this roll there acts a roll 50 of smaller diameter which is maintained within the reverse sockets 51 of a pair of arms 52 the latter being pivoted to the respective side walls 46 in such a manner that the small roll may press by gravity upon the face of the larger roll 49. It is between these gravitationally mated rolls that the base bands are fitted to the stitching appliances whereby they are to be embedded within the corrugations of the rim 28.

The stitching appliance consists of a number of bevel-edged disks 53 which are independently mounted upon a shaft 54, the latter being arranged within the open bearing sockets 55 of the U-shaped mounting frame 56. The latter is formed within its base portion with a central boss 57 whereby it may be mounted upon the upwardly projecting bearing pin 58 which is formed integrally with the forward extremity of the stitcher plate 32. A boss 59 surrounds the pin 58 and coöperates with the lower face of the boss 57 to provide a ball race wherein may be arranged the anti-friction bearings 60. The U-shaped mounting frame 56 is thus free to oscillate in a horizontal plane, such oscillation being regulated and checked by means of the adjustable thumb screws 61 which are carried by the upright side frames 46 to impinge against the backs of the bearing sockets 55 of the stitcher frame.

The number of the stitching disks 53 corresponds exactly to the number of corrugations or circumferential indentations of the channeled rim 28. Each of these disks 53 is formed upon its interior circumference with an annular socket groove 62 in which is accommodated a semi-circular spring 63, the latter being formed with an inwardly turned locking extremity 64 which is adapted to be received within a groove 65 formed entirely across the upper surface of the bearing shaft 54 upon which the stitching disks are mounted. In this manner each of the stitching disks is independently mounted to give easily to any roughness or irregularity of the rim corrugation in which it travels.

In order to insure the uniform placement of the shaft 54 with its mounted stitcher disks, each time that it is assembled upon the stitcher head, one extremity of the shaft is formed with the beveled portions 66 which mate with the similarly beveled portions 67 of a locking plate 68, the latter being received within upright sockets 69 formed by the space between the pair of members 70 which compose each of the shaft bearing portions 55. This locking plate may be arranged within either of the bearing portions, since the latter are formed exactly alike, and in any case determines the correct placing of the shaft 54 in order that the stitching disks may be presented to the rim surface with uniformity in successive operations.

The necessity for this will be seen in the condition which governs the arrangement of the various mounting disks with respect to individual rims. The corrugations of the latter frequently vary minutely in depth and width, and the most efficient operation of the stitching disks requires the latter to be rated in such minutely varying sizes as to cover the entire range of variations in the dimensions of the rim corrugations. Before applying the base band to any particular rim the operator can make a trial of the manner in which the individual disks fit in respective grooves upon the rim periphery and may so vary the grouping of the disks that an exact fit is obtained, since each of the disks is readily removable from its mounting shaft, although they are maintained in a group form by means of the adjustable collars 71.

The rim stand B consists simply of a pedestal portion 72 upon which is mounted the revoluble chuck 73, the latter being of the usual construction, carrying extensible arms 74 which may be radially adjusted with respect to the axis of the chuck through the medium of the operating hand wheel 75. A motor 76 is arranged upon the base of the pedestal 72 and drives, by belt connection 77 the conutershaft 78. The latter is equipped with a worm 79 adapted to mesh with the worm wheel 80 which in turn is carried upon the shaft 81 of the chuck. The extremities of the extensible chuck arms 74 are formed with a chisel edge adapted to fit within an interior central groove formed in the base of the rim.

The rim once mounted, and a cemented base band having been dried until it is in condition for application to the rim, the band is laid upon the large roll 49 of the stitcher head and fed therebetween and the gravity roller 50, the extremities of the band being allowed to overlie the stitching disks in the manner indicated by the dotted lines 82 of Fig. 1. The stitcher head is then centered upon the rim 28 and is fed thereagainst by means of the screw shaft 41, the operator maintaining the stitcher disks against the rim corrugations by depression of the foot lever 34. The motor 76 is now started for rotation of the rim and the base band is then fitted by the stitcher disks against the rim channel and firmly embedded in the corrugations thereof.

I have ascertained that the method of applying securing bands to solid tire vehicle rims in this manner is much more efficient and economical than the hand method hitherto employed, and I have further ascertained that the arrangement of the various elements A, B, and C of the present system in the manner herein disclosed correlates the various steps in this phase of solid tire manufacture into a system which discloses decided advantages over any other arrangement hitherto proposed to my knowledge.

What I claim is:

1. In an apparatus for the application of a band of material to the channel of a wheel rim; a stitching apparatus including a support; a carriage base movable with respect to the support; means for moving said carriage base bodily; and means embodied in the first mentioned means for preadjusting the amount of bodily movement or throw of said base with respect to the support.

2. In an apparatus for the application of a band of material to the channel of a wheel rim, a rotatable support for the wheel rim, means for pressing the band of material on to the wheel rim, including a plurality of independent revolving disks, and supporting means mounting the disks as a unit group which may be pressed against the wheel rim to cause all of said disks to simultaneously engage therewith, means embodied in the mounting of the disks whereby said disks may be oscillated as a unit group, and means whereby said unit group of disks may be projected against the rim or withdrawn from engagement therewith.

3. An apparatus for the application of a band of material to the channel of a wheel rim, including a rotatable support for a wheel rim, a stitching device adapted to be engaged with the wheel rim for pressing the band of material thereon, a slidable support for the stitching device and a member associated with said slidable support and adapted to carry the supply of the material being pressed upon the wheel rim.

4. In an apparatus for the application of a band of material to an annular object; a stitching apparatus including a support; a head adjustable upon said support; a frame mounted for oscillation upon said head; means for regulating the amount of oscillation of said frame; and a plurality of stitching disks grouped to form independently operable units adapted to simultaneously contact with the circumference of the annular object and to independently yield to irregularities in their respective paths.

5. In an apparatus for the application of a band of material to the channel of a wheel rim; a stitching apparatus including a support; and a stitcher head adjustable upon the support; stitcher means arranged upon said head, comprising a plurality of independent stitching disks grouped to cover the surface of the rim and of the band to be applied thereto and means for yieldably mounting each of the stitcher disks in order that they may yield independently upon meeting irregularities in the wheel rim with which they are adapted to contact during rotation of the rim in the application of the band to the rim.

6. In an apparatus for the application of a band of material to the channel of a wheel rim; a stitching apparatus including a support; a stitcher head adjustable upon the support; and stitching means comprising an oscillatably mounted frame, a shaft carried by said frame, a plurality of independent stitching disks grouped upon said shaft, and means for resiliently mounting each of the stitcher disks in order that they may yield independently upon meeting obstructions encountered during rotation of the wheel rim with which they are adapted to contact in the application of the band to the rim.

7. In an apparatus for the application of a band of material to the channel of a wheel rim; a stitching apparatus including a support, a head adjustable upon said support, a frame mounted for oscillation upon said head, means for regulating the amount of oscillation of said frame, and a plurality of stitching disks grouped to form independently operable units adapted to contact with circumferential portions of the wheel rim, during rotation of the rim.

8. In an apparatus for applying a rubber covering to a wheel rim having a plurality of corrugations, a plurality of independent stitching disks arranged to travel in the corrugations of said rim; and means resiliently mounting the independent disks to render them independently yieldable upon the encountering of obstructions in their respective paths of travel on the wheel rim.

9. In an apparatus for the application of a band of material to the channel of a wheel rim; a pedestal; a revoluble support for the rim juxtaposed to the pedestal; a stitcher plate adapted to be adjusted upon the pedestal both in the path of the plane of rotation of the rim and in a path transverse thereto; a stitching element carried by the plate;

and a support movable with the stitcher plate for a roll of material whereby the stitching element and roll of material may be simultaneously centered with respect to the rim by a transverse adjustment of the stitcher plate.

10. A device adapted to be pressed against the outer circumference of a corrugated rim for pressing a band of rubber into the corrugations and over the ribs defined therebetween, including a plurality of disks each adapted to enter one of the grooves of the rim, means supporting the disks and maintaining them as a unit group whereby they may be simultaneously pressed against the rim, and means associated with said first mentioned means whereby each of said disks may independently yield to irregularities encountered during rotation of the rim.

11. A device adapted to be pressed against the outer circumference of a corrugated rim for pressing a band of rubber into the corrugations and over the ribs defined therebetween, including an axle, a plurality of disks mounted thereon, a member rotatably supporting the axle, a slide supporting the said axle supporting member, said slide being reciprocable to permit the disks to be projected into engagement with or protracted from engagement with the rim to be treated, and means whereby the axle supporting member may oscillate upon the slide to permit the disks to oscillate as a group unit with respect to the outer face of the rim being treated.

12. A device adapted to be pressed against the outer circumference of a corrugated rim for pressing a band of rubber into the corrugations and over the ribs defined therebetween, including a shaft, a plurality of disks mounted on the shaft, and a plurality of springs surrounding the shaft, each of said spring members being associated with one of the disk members and being arranged to yieldably support its disk upon the shaft whereby the said disks are normally maintained in concentric relation to the shaft but may independently yield to assume an eccentric relation thereto.

13. An apparatus of the character described, including a rotatable support for a wheel rim, a slide reciprocable toward and away from the outer face of the wheel rim, a plurality of disks mounted upon the slide and adapted to engage with the face of the rim, when the slide is advanced, to press the band of material on to the rim, and mechanism controlling the reciprocation of the slide, said mechanism including a quick acting means whereby the slide may be rapidly advanced until the disks engage with the rim, and a slow acting means operable for advancing the disks beyond the point to which they may be projected by the quick acting mechanism, whereby the required pressure of the disks against the rim may be obtained.

14. In a device for shaping a band of material to a revolving annular form, a slide adapted to reciprocate toward and away from the form, a shaping member mounted on the slide and adapted to be engaged with the form when the slide is advanced, and means for advancing and returning the slide, said means including a quick acting mechanism operable for advancing the slide until the shaping member is engaged with the form, and a relatively slow acting mechanism operable for further advancing the slide whereby the desired delicate degree of pressure of the forming members against the form may be obtained and controlled.

In testimony whereof I have signed my name in the presence of two subscribing witnesses.

EDWARD NALL.

Witnesses:
L. E. WAGNER,
B. J. MCDANEL.